3,738,833
PHOTOCONDUCTIVE ELEMENTS CONTAINING
HALOGENATED POLY-α-OLEFIN BINDERS
Stewart H. Merrill, Rochester, and Lawrence E. Contois, Webster, N.Y., assignors to Eastman Kodak Company, Rochester, N.Y.
No Drawing. Continuation of abandoned application Ser. No. 812,446, Apr. 1, 1969, which is a continuation-in-part of application Ser. No. 755,716, Aug. 27, 1968, now Patent No. 3,652,269. This application July 20, 1971, Ser. No. 164,444
Int. Cl. G03g 5/04, 5/06
U.S. Cl. 96—1.6                                    12 Claims

ABSTRACT OF THE DISCLOSURE

Photoconductive elements containing a photoconductor and a binder comprising polymers of halogenated poly-α-olefins are described. These elements can be sensitized and charged either negatively or positively.

---

This application is a continuation of Ser. No. 812,446, now abandoned which in turn is a continuation of Ser. No. 755,716 filed Aug. 27, 1968, now U.S. Patent No. 3,652,269, by L. E. Contois and S. H. Merrill entitled "Photoconductive Elements Containing Polymeric Binders."

This invention relates to novel electrophotographic elements having coatings of binder-containing photoconductive compositions and also to process for producing images using these elements.

Binder-containing photoconductive compositions have been widely used in the preparation of electrophotographic elements. In electrophotographic reproduction processes, these elements are utilized in the formation of latent electrostatic images. In some applications the photoconductive compositions contain an organic photoconductor and a sensitizer uniformly admixed in an inert resinous binder. Many binders are currently used in connection with a wide variety of available organic photoconductor compounds and compositions. Typical binders are ordinary polymeric materials, e.g., phenolic resins, ketone resins, acrylic ester resins, polystyrene, etc. However, these binders usually do not impart any particular improvement in light sensitivity to the system. The light sensitivity as indicated by the electrical speed of these particular systems is ordinarily due wholly to the organic photoconductor and sensitizer.

Chlorinated polyethylenes having a low chlorine content, i.e., less than about 33% chlorine, have been used as binders for organic photoconductors. These polymers generally shift the spectral sensitivity of the photoconductive composition but are insoluble in most solvents and must be heated with the photoconductor to temperatures generally ranging above 80° C. for 15 hours or more. This required heating step makes the binder more soluble eliminating coating and compatibility problems and also causes a reaction to occur between the binder and photoconductor so that the spectral sensitivity of the reaction product is shifted. These materials are more fully described in British Patent 964,878.

It is therefore, an object of this invention to provide improved novel binder-containing photoconductive compositions which exhibit high light sensitivities.

It is another object to provide transparent electrophotographic elements having the high speed characteristic of the novel photoconductive compositions of this invention.

It is a further object of this invention to provide a process for producing images using these novel electrophotographic elements.

These and other objects of this invention are accomplished by a photoconductive composition which contains a nonpolymeric organic photoconductor admixed with a binder which is a halogenated poly-α-olefin prepared from an α-olefin monomer having 2 to 8 carbon atoms. In those instances where the halogenated poly-α-olefin is a halogenated polyethylene, improved results are obtained when the halogen content is at least 50% by weight of the polymer composition. However, when the halogenated poly-α-olefin is one prepared from an α-olefin monomer containing more than 2 carbon atoms such as propylene, butylene, isobutylene, pentylene, etc. and mixtures thereof to form copolymers, improved results are obtained when the halogen content is at least 10% by weight of the polymer composition. In those instances where the halogenated poly-α-olefin is a halogenated copolymer of ethylene with an α-olefin monomer having more than 2 carbon atoms, improved results are realized when the halogen content is at least 50% if the copolymer contains predominately ethylene repeating units and is at least 10% if the copolymer contains predominately repeating units of the other comonomer.

In preparing the photoconductive compositions of this invention, a non-polymeric organic photoconductor is mixed with one of the following halogenated poly-α-olefin binders in a suitable solvent at room temperature:

(A) a halogenated polyethylene containing at least 50% by weight halogen and preferably 50% to 70% by weight halogen based on the polymer composition;

(B) a halogenated poly-α-olefin, prepared from α-olefin monomers including mixtures thereof having 3 to 8 carbon atoms, containing from about 10% to about 80% by weight of halogen and preferably from about 45% to about 70% by weight halogen based on the polymer composition;

(C) a halogenated poly-α-olefin copolymer containing predominately (i.e., 50% or greater) repeating units of ethylene together with (i.e., the remainder) repeating units derived from an α-olefin monomer having 3 to 8 carbon atoms and additionally containing at least 50% by weight halogen and preferably from about 50% to about 70% by weight halogen based on the polymer composition; or (D) a halogenated poly-α-olefin copolymer containing predominately (i.e., 50% or greater) repeating units derived from an α-olefin monomer having 3 to 8 carbon atoms together with ethylene repeating units (i.e., the remainder) and additionally containing from about 10% to about 80% by weight halogen and preferably from about 45% to about 70% by weight halogen based on the polymer composition.

No heating is required in that there are no solubility or coating problems. Also, there is no waiting period for a reaction to occur. The composition is thoroughly mixed and then coated on an electrically conducting support in a well-known manner, such as swirling, spraying, doctor-blade coating and the like.

It has been discovered that such compositions exhibit increased light sensitivities as evidenced by greater electrical speeds. In particular, substantial increases in electrical speeds (i.e., toe and shoulder speeds) are obtained with reference to the standard H and D curve as compared to electrical speeds attainable with many other polymeric binder compositions. These increases in electrical speed are observed when the coating accepts a suitable potential (e.g., 500–600 volts) and the relative speed of the coating is determined on the basis of the reciprocal of the exposure required to reduce the potential of the surface charge by 100 volts (shoulder speed) or to 100 volts (toe speed). The terms "shoulder speed" and "toe speed" are terms known in the xerographic art with reference to "H and D" curves. As used herein, such terms refer to related curves resulting from exposure plotted against voltage. The reduction of the surface potential to 100 volts or below is significant in that it represents a requirement for suitable broad area development of an electrostatic latent image. The relative speed at 100 volts is a measure of the ability to produce and henceforth to develop or otherwise utilize the electrostatic latent image. When the photoconductor is absent from the coating and only a conventional binder is used, the surface potential does not drop to or below 100 volts and therefore no speed can be assigned to such a composition. When an organic photoconductor is part of the coating in many conventional polymeric binders, the surface potential of the resultant composition usually drops below 100 volts, and thus a definite speed can be ascertained. However, these speeds are improved when the binders of this invention are employed.

The novel binders of this invention improve the electrical speeds of compositions containing a wide variety of photoconductors including inorganic photoconductors such as zinc oxide, titanium dioxide, cadmium sulfide and the like and organic photoconductors including organometallic photoconductors.

Typical photoconductors useful with the binders of this invention are described below.

(A) Arylamine photoconductors including substituted and unsubstituted arylamines, diarylamines, nonpolymeric triarylamines and polymeric triarylamines such as those described in U.S. Pats. 3,240,597 and 3,180,730.

(B) Photoconductors represented by the formula

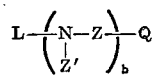

wherein Z represents a mononuclear or polynuclear divalent aromatic radical, either fused or linear (e.g., phenyl, naphthyl, biphenyl, binaphthyl, etc.), or a substituted divalent aromatic radical of these types wherein said substituent can comprise a member such as an acyl group having from 1 to about 6 carbon atoms (e.g., acetyl, propionyl, butyryl, etc.), an alkyl group having from 1 to about 6 carbon atoms (e.g., methyl, ethyl, propyl, butyl, etc.), an alkoxy group having from 1 to about 6 carbon atoms (e.g., methoxy, ethoxy, propoxy, pentoxy, etc.), or a nitro group; Z represents a mononuclear or polynuclear monovalent or polynuclear monovalent aromatic radical, either fused or linear (e.g., phenyl, naphthyl, biphenyl, etc.); or a substituted monovalent aromatic radical wherein said substituent can comprise a member, such as an acyl group having from 1 to about 6 carbon atoms (e.g., acetyl, propionyl, butyryl, etc.), an alkyl group having from 1 to about 6 carbon atoms (e.g., methyl, ethyl, propyl, butyl, etc.), an alkoxy group having from 1 to about 6 carbon atoms (e.g., methoxy, propoxy, pentoxy, etc.), or a nitro group; Q can represent a hydrogen atom or an aromatic amino group, such as Z'NH—; b represents an integer from 1 to about 12, and L represents a hydrogen atom, a mononuclear or polynuclear aromatic radical, either fused or linear (e.g., phenyl, naphthyl, biphenyl, etc.), a substituted aromatic radical wherein said substituent comprises an alkyl group, an alkoxy group, an acyl group, or a nitro group, or a poly(4'-vinylphenyl) group which is bonded to the nitrogen atom by a carbon atom of the phenyl group, these materials being more fully described in U.S. Pat. 3,265,496.

(C) Polyarylalkane photoconductors including leuco bases of diaryl or triarylmethane dye salts, 1,1,1-triarylalkanes wherein the alkane moiety has at least two carbon atoms and tetraarylmethanes having an amino group substituted in at least one of the aryl nuclei attached to the alkane and methane moieties of the latter two classes of photoconductors which are non-leuco base materials; and also other polyarylalkanes included by the formula:

wherein each of D, E and G is an aryl group and J is a hydrogen atom, an alkyl group, or an aryl group, at least one of D, E and G containing an amino substituent, the aryl groups attached to the central carbon atom being preferably phenyl groups, although naphthyl groups can also be used including substituted aryl groups containing substituents such as alkyl and alkoxy typically having 1 to 8 carbon atoms, hydroxy, halogen, etc. in the ortho, meta or para positions, ortho-substituted phenyl being preferred; the aryl groups can also be joined together or cyclized to form a fluorene moiety, for example; the amino substituent can be represented by the formula

wherein each R can be an alkyl group typically having 1 to 8 carbon atoms, a hydrogen atom, an aryl group, or together the necessary atoms to form a heterocyclic amino group typically having 5 to 6 atoms in the ring such as morpholino, pyridyl, pyrryl, etc.; at least one of D, E and G preferably being a p-dialkylaminophenyl group, when J is an alkyl group, such an alkyl group more generally has 1 to 7 carbon atoms, these materials being more fully described in U.S. Pat. 3,274,000, French Pat. 1,383,-461 and in U.S. Ser. No. 627,857 filed Apr. 3, 1967, now U.S. Pat. No. 3,542,544, by Seus and Goldman.

(D) Photoconductors comprising 4-diarylamino-substituted chalcones having the formula:

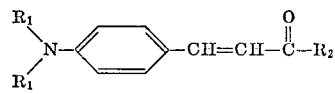

wherein $R_1$ and $R_2$ are each phenyl radicals including substituted phenyl radicals, $R_2$ preferably having the formula

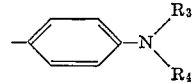

wherein $R_3$ and $R_4$ are each aryl radicals, aliphatic residues of 1 to 12 carbon atoms such as alkyl radicals preferably having 1 to 4 carbon atoms, or hydrogen; particularly advantageous results being obtained when $R_1$ is a phenyl radical including a substituted phenyl radical and where $R_2$ is diphenylaminophenyl, dimethylaminophenyl or phenyl, these materials being more fully described in Fox application U.S. Ser. No. 613,846, now U.S. Pat. No. 3,526,501.

(E) Non-ionic cycloheptenyl compounds which may be substituted with substituents such as (a) an aryl radical including substituted as well as unsubstituted aryl radicals, (b) a hydroxy radical, (c) an azido radical, (d) a heterocyclic radical having 5 to 6 atoms in the heterocyclic nucleus and at least one hetero nitrogen atom, and including substituted and unsubstituted heterocyclic radicals, and (e) an oxygen linked cycloheptenyl moiety. The substitution on the cycloheptenyl nucleus occurs at an unsaturated carbon atom when the cycloheptenyl moiety is a conjugated triene with an aromatic structure fused thereto. However, if there is at least one aromatic structure fused to the cycloheptenyl moiety, then the substituents are attached to a saturated carbon atom. Additional photoconductors within this class are included in one of the following formulae:

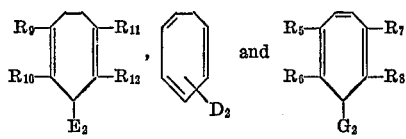

where $E_2$ and $G_2$ can be either:

(a) a phenyl radicals,
(b) a naphthyl radical,
(c) a heterocyclic radical having 5 to 6 atoms in the heterocyclic nucleus and at least one hetero nitrogen atom,
(d) a hydroxyl radical, or
(e) an oxygen containing radical having a structure such that the resultant cycloheptenyl compound is a symmetrical ether;

$D_2$ can be any of the substituents defined for $E_2$ and $G_2$ above and is attached to a carbon atom in the cycloheptenyl nucleus having a double bond; ($R_9$ and $R_{10}$), ($R_{11}$ and $R_{12}$), ($R_5$ and $R_6$), and ($R_7$ and $R_8$) are together the necessary atoms to complete a benzene ring fused to the cycloheptenyl nucleus; these compounds being more fully described in U.S. Ser. No. 654,091 filed July 18, 1967, now U.S. Pat. No. 3,533,786.

(F) Compounds containing an

nucleus including (1) unsubstituted and substituted N, N-bicarbazyls containing substituents in either or both carbazolyl nuclei such as (a) an alkyl radical including a substituted alkyl radical such as a haloalkyl or an alkoxyalkyl radical,
(b) a phenyl radical including a substituted phenyl radical such as a naphthyl, an aminophenyl or a hydroxyphenyl radical,
(c) a halogen atom,
(d) an amino radical including substituted as well as unsubstituted amino radicals such as an alkylamino or a phenylalkylamino radical,
(e) an alkoxy radical,
(f) a hydroxyl radical,
(g) a cyano radical,
(h) a heterocyclic radical such as a pyrazolyl, a carbazolyl or pyridyl radical;

or (2) tetra-substituted hydrazines containing substituents which are substituted or unsubstituted phenyl radicals, or heterocyclic radicals having 5 to 6 atoms in the hetero nucleus, suitable results being obtained when all four substituents are not unsubstituted phenyl radicals, i.e., if at least one substituent is a substituted phenyl radical or a heterocyclic radical having 5 to 6 atoms in the hetero nucleus. Other tetra-substituted hydrazines include those having the following formula:

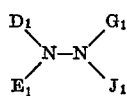

wherein $D_1$, $E_1$, $G_1$ and $J_1$ are each either (a) a substituted phenyl radical such as a naphthyl radical, an alkylphenyl radical, a halophenyl radical, a hydroxyphenyl radical, a haloalkylphenyl radical or a hydroxyalkylphenyl radical or
(b) a heterocyclic radical such as an imidazolyl radical, a furyl radical or a pyrazolyl radical. In addition, $J_1$ and $E_1$ can also be
(c) an unsubstituted phenyl radical. Especially preferred are those tetra-substituted hydrazines wherein both $D_1$ and $G_1$ are either substituted phenyl radicals or heterocyclic radicals. These compounds are more fully described in U.S. Ser. No. 673,962 filed Oct. 9, 1967, now U.S. Pat. No. 3,542,546.

(G) Organic compounds having a 3,3'-bis-aryl-2-pyrazoline nucleus which is substituted in either five-member ring with the same or different substituents. The 1 and 5 positions on both pyrazoline rings can be substituted by an aryl moiety including unsubstituted as well as substituted aryl substituents such as alkoxyaryl, alkaryl, alkaminoaryl, carboxylaryl, hydroxyaryl and haloaryl. The 4 position can contain hydrogen or unsubstituted as well as substituted alkyl and aryl radicals such as alkoxyaryl, alkaryl, alkaminoaryl, haloaryl, hydroxyaryl, alkoxyalkyl, aminoalkyl, carboxyaryl, hydroxyalkyl and haloalkyl. Other photoconductors in this class are represented by the following structure:

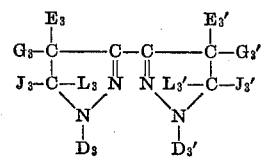

wherein:

$D_3$, $D'_3$, $J_3$ and $J'_3$ can be either a phenyl radical including a substituted phenyl radical such as a tolyl radical or a naphthyl radical including a substituted naphthyl radical, $E_3$, $E'_3$, $G_3$, $G'_3$ and $L'_3$ can be any of the substituents set forth above and in addition can be either a hydrogen atom or an alkyl radical containing 1-8 carbon atoms. These organic photoconductors are more fully described in U.S. Ser. No. 664,642 filed Aug. 31, 1967, now U.S. Pat. No. 3,527,602.

(H) Triarylamines in which at least one of the aryl radicals is substituted by either a vinyl radical or a vinylene radical having at least one active hydrogen-containing group. The phrase "vinylene radical" includes substituted as well as unsubstituted vinylene radicals and also includes those radicals having at least one and as many as three repeating units of vinylene groups such as $(CH=CH)_n$ wherein $n$ is an integer of from one to three. Groups which contain active hydrogen are well known in the art, the definition of this term being set forth in several textbooks such as "Advance Organic Chemistry," R. C. Fuson, pp. 154-157, John Wiley & Sons, 1950. The term "active hydrogen-containing group" as used herein includes those compounds encompassed by the discussion in the textbook cited above and in addition includes those compounds which contain groups which are hydrolyzable to active hydrogen-containing groups. Typical active hydrogen-containing groups substituted on the vinylene radical of the triarylamine include:

(a) carboxy radicals,
(b) hydroxy radicals,
(c) ethynyl radicals,
(d) ester radicals (e.g.,

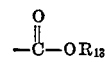

wherein R is alkyl or aryl) including cyclic ester radicals (e.g.,

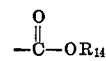

wherein $R_{14}$ is a cyclic alkylene radical connected to a vinylene combination such as is found in coumarin derivatives), (e) carboxylic acid anhydride radicals,
(f) semicarbazono radicals, (g) cyano radicals,
(h) acyl halide radicals (e.g.,

etc.); and
(i) amido radicals (e.g.,

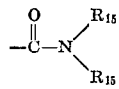

wherein $R_{15}$ is a hydrogen atom, an alkyl group or an aryl group).

Other active hydrogen-containing groups include substituted and unsubstituted alkylidyne oximido radicals. Photoconductors included in this class can be represented by the following structure:

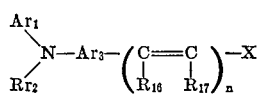

wherein:

(a) $Ar_1$ and $Ar_2$ are each a phenyl radical including a substituted phenyl radical such as a halophenyl radical, an alkyl phenyl radical or an aminophenyl radical;
(b) $Ar_3$ is an arylene radical including a substituted arylene radical such as a phenylene radical or a naphthylene radical,
(c) $R_{16}$ and $R_{17}$ are each hydrogen, a phenyl radical including a substituted phenyl radical or a lower alkyl radical preferably having 1–8 carbon atoms;
(d) X is either (1) an active hydrogen-containing group such as a carboxy radical, an acyl halide radical, an amido radical, a carboxylic acid anhydride radical, an ester radical, a cyano radical, a hydroxy radical, a semicarbazono radical, an ethynyl radical, or a methylidyne oximido radical, or (2) hydrogen, provided that when X is hydrogen $R_{16}$ and $R_{17}$ are also hydrogen; and
(e) $n$ is an integer of one to three.

The arylene nucleus can be substituted in any position by the vinyl or vinylene moiety. However, when $Ar_3$ is phenylene, particularly good results are obtained if the substitution occurs in the para position. These materials are more fully described in U.S. Ser. No. 706,800 filed Feb. 20, 1968, now U.S. Pat. No. 3,567,450.

(I) Triarylamines in which at least one of the aryl radicals is substituted by an active hydrogen-containing group. The term "active hydrogen-containing group" has the same meaning as set forth above and again includes those compounds encompassed by the discussion in the textbook and additionally includes those compounds which contain groups which are hydrolyzable to active hydrogen-containing groups. Typical active hydrogen-containing groups which are substituted on an aryl radical of the triarylamine include:

(a) carboxy radicals;
(b) hydroxy radicals;
(c) ethynyl radicals;
(d) ester radicals (e.g.,

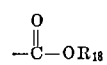

wherein $R_{18}$ is an alkyl or an aryl group);
(e) lower alkylene hydroxy radicals (e.g., having 1–8 carbon atoms);
(f) carboxylic acid anhydride radicals;
(g) lower alkylene carboxy radicals (e.g., having 2–8 carbon atoms);
(h) cyano radicals;
(i) acyl halide radicals (e.g.,

etc.);
(j) amido radicals (e.g.,

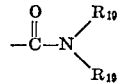

wherein $R_{19}$ is a hydrogen atom, an alkyl group or an aryl group);
(k) lower alkylidyne oximido radicals having 1–8 carbon atoms including substituted alkylidyne oximido radicals (e.g.,

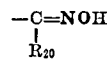

wherein $R_{20}$ is hydrogen or a lower alkyl radical);
(l) semicarbazono radicals; and
(m) arylene carboxy radicals including substituted arylene carboxy radicals (e.g.,

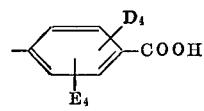

wherein $D_4$ and $E_4$ are phenyl or lower alkyl radicals. Photoconductors included in this class can be represented by the following structure:

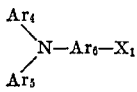

wherein:

(a) $Ar_4$ and $Ar_5$ are each a phenyl radical including a substituted phenyl radical such as a halophenyl radical, an alkyl phenyl radical or an amino phenyl radical;
(b) $Ar_6$ is an arylene radical including a substituted arylene radical such as a phenylene radical or a naphthylene radical; and
(c) $X_1$ is an active hydrogen-containing group such as a carboxy radical, an acyl halide radical, an amido radical, a carboxylic acid anhydride radical, an ester radical, a cyano radical, a semicarbazono radical, a hydroxy radical, an ethynyl radical, a methylidyne oximido radical or a phenylene carboxy radical. These materials are more fully described in U.S. Ser. No. 706,780 filed Feb. 20, 1968, now U.S. Pat. No. 3,658,820.

(J) Organo-metallic compounds having at least one amino-aryl substituent attached to a Group IVa or Group Va metal atom. The metallic substituents of this class of organic photoconductors are Group IVa or Group Va metals in accordance with the Periodic Table of the Elements (Handbook of Chemistry and Physics, 38th edition, pp. 394–95) and include silicon, germanium, tin and lead from Group IVa and phosphorus, arsenic, antimony and bismuth from Group Va. These materials can be substituted in the metallo nucleus with a wide variety of substituents but at least one of the substituents must be an amino-aryl radical. The amino radical can be positioned anywhere on the aromatic nucleus, but best results are obtained if the aryl moiety is a phenyl radical having the amino group in the 4 or para position. Typical substituents attached to the metal nucleous include the following:

(a) a hydrogen, sulfur or oxygen atom,
(b) an alkyl radical,
(c) an aryl radical including unsubstituted as well as substituted aryl radicals such as aminoaryl, alkylaryl and haloaryl, (d) an oxygen-containing radical such as an alkoxy or aryloxy radical,
(e) an amino radical including unsubstituted and substituted amino radicals such as mono- and diarylamino and mono- and dialkylamino radicals.
(f) a heterocyclic radical and
(g) a Group IVa or Va organo metallic radical.

Photoconductors included in this class can be represented by the following structures:

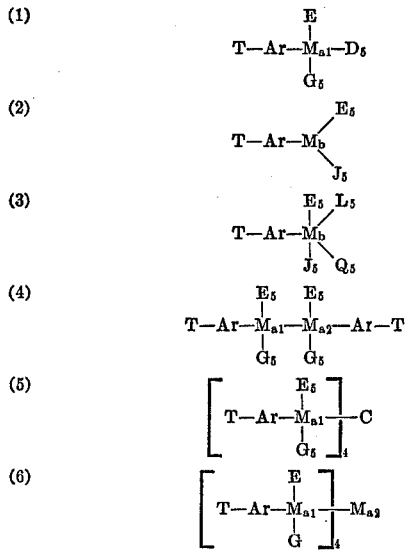

where
$E_5$, $G_5$ $L_5$ and $Q_5$ can be
(a) a hydrogen atom,
(b) an aryl radical including unsubstituted as well as substituted aryl radicals such as a phenyl radical, a naphthyl radical, a dialkylaminophenyl radical, or a diarylaminophenyl radical,
(c) an alkyl radical having 1 to 8 carbon atoms,
(d) an alkoxy radical having 1 to 8 carbon atoms,
(e) an aryloxy radical such as a phenoxy radical,
(f) an amino radical having the formula

wherein $R_{21}$ and $R_{22}$ can be hydrogen atoms or alkyl radicals having 1 to 8 carbon atoms, or
(g) a heterocyclic radical having 5 to 6 atoms in the hetero nucleus including at least one nitrogen atom such as a triazolyl, a pyridyl radical, etc.;

T is an amino radical such as an alkylamino radical having 1 to 8 carbon atoms or an arylamino radical such as a phenylamino radical;
Ar is an aromatic radical such as phenyl or naphthyl;
$M_{a1}$ and $M_{a2}$ are the same or different Group IVa metals;
$M_b$ is a Group Va metal;
$D_5$ can be any of the substituents set forth above for $E_5$, $G_5$, $L_5$ and $Q_5$ and in addition can be a Group IVa organo-metallic radical or when taken with E, and oxygen atom or a sulfur atom;
$J_5$ can be any of the substituents set forth above for $E_5$, $G_5$, $L_5$ and $Q_5$ and in addition can be when taken with E, an oxygen atom or a sulfur atom. These materials are described in U.S. Ser. No. 650,664 filed July 3, 1967, now U.S. Pat. No. 3,647,429.

(K) Any other organic compound which exhibits photoconductive properties such as those set forth in Australian Patent 248,402.

Representative organic photoconductors useful in this invention include the compounds listed below:

TABLE I diphenylamine
dinaphthylamine
N,N'-diphenylbenzidine
N-phenyl-1-naphthylamine
N-phenyl-2-naphthylamine
N,N'-diphenyl-p-phenylenediamine
2-carboxy-5-chloro-4'-methoxydiphenylamine
p-anilinophenol
N,N'-di-2-naphthyl-p-phenylenediamine
4,4'-benzylidene-bis-(N,N-dimethyl-m-toluidine)
triphenylamine
N,N,N',N'-tetraphenyl-m-phenylenediamine
4-acetyltriphenylamine
4-hexanoyltriphenylamine
4-lauroyltriphenylamine
4-hexyltriphenylamine
4-dodecyltriphenylamine
4,4'-bis(diphenylamino)benzil
4,4'-bis(diphenylamino)benzophenone
poly[N,4''-(N,N',N'-triphenylbenzidine)]
polyadipyltriphenylamine
polysebacyltriphenylamine
polydecamethylenetriphenylamine
poly-N-(4-vinylphenyl)diphenylamine
poly-N-(vinylphenyl)-α,α'-dinaphthylamine
4,4'-benzylidene-bis(N,N-diethyl-m-toluidine)
4',4''-diamino-4-dimethylamino-2',2''-dimethyltriphenylmethane
4',4''-bis(diethylamino)-2,6-dichloro-2',2''-dimethyltriphenylmethane
4',4''-bis(diethylamino)-2',2''-dimethyldiphenylnaphthylmethane
2',2''-dimethyl-4,4',4''-tris(dimethylamino)triphenylmethane
4',4''-bis(diethylamino)-4-dimethylamino-2',2''-dimethyltriphenylmethane
4',4''-bis(diethylamino)-2-chloro-2',2''-dimethyl-4-dimethylaminotriphenylmethane
4',4''-bis(diethylamino)-4-dimethylamino-2,2',2''-trimethyltriphenylmethane
4',4''-bis(dimethylamino)-2-chloro-2',2''-dimethyltriphenylmethane
4',4''-bis(dimethylamino)-2',2''-dimethyl-4-methoxytriphenylmethane
Bis(4-diethylamino)-1,1,1-triphenylethane
Bis(4-diethylamino)tetraphenylmethane
4,4''-bis(benzylethylamino)-2',2''-dimethyltriphenylmethane
4,4''-bis(diethylamino)-2',2''diethoxytriphenylmethane
4,4'-bis(dimethylamino)-1,1,1-triphenylethane
1-(4-N,N-dimethylaminophenyl)-1,1-diphenylethane
4-dimethylaminotetraphenylmethane
4-diethylaminotetraphenylmethane
4,4'-bis(diphenylamino)chalcone
4-diphenylamino-4'-dimethylaminochalcone
4-dimethylamino-4'-diphenylaminochalcone
4,4'-bis(dimethylamino)chalcone
4,4'-bis(diethylamino)chalcone
4-dimethylamine-4'-diphenylaminochalcone
4,4'-bis(n-amyloxy)chalcone
4,4'-bis(nitro)chalcone
4-diphenylaminochalcone
4-dimethylaminochalcone
4'-diphenylaminochalcone
4'-dimethylaminochalcone
bis-[5-(5H-dibenzo[a,d]cycloheptenyl)]ether
5-hydroxy-5H-dibenzo[a,d]cycloheptene
1-{5-(5H-dibenzo[a,d]cycloheptenyl)}-4,5-dicarbomethoxy-1,2,3-triazole
1-{5-(5H-dibenzo[a,d]cycloheptenyl)}-4,5-dibenzoyl-1,2,3-triazole 5-azido-5H-dibenzo[a,d]cycloheptene
1-{5-(10,11-dihydro-5H-dibenzo[a,d]cycloheptenyl)}-4,5-dicarbomethoxy-1,2,3-triazole
1-{5-(10,11-dihydro-5H-dibenzo[a,d]cycloheptenyl)}-4,5-dibenzoyl-1,2,3-triazole
4-[5-(5H-dibenzo[a,d]cycloheptenyl)]-N,N-dimethyl aniline
N,N-diethyl-3-methyl-4-[5-(5H-dibenzo[a,d]cycloheptenyl)]aniline
4-[5-(5H-dibenzo[a,d]cycloheptenyl)]-1-dimethylaminonaphthalene
N,N-diethyl-3-methyl-4-[5-(10,11-dihydro-5H-dibenzo[a,d]cycloheptenyl)]aniline
3-(4-dimethylaminophenyl)-1,3,5-cycloheptatriene
3-(4-diethylamino-2-methylphenyl)-1,3,5-cycloheptatriene
3-(4-dimethylaminonaphthyl)-1,3,5-cycloheptatriene
N,N-diethyl-3-methyl-4-[5-(5H-dibenzo[a,d]cycloheptenyl)]aniline
tetra-α-naphthylhydrazine
tetra(α-methyl-4-hydroxyphenyl)hydrazine
tetra(m-hydroxyethylphenyl)hydrazine
tetra(2-methyl-5-chloroethylphenyl)hydrazine
tetra(2-methyl-5-hydroxyphenyl)hydrazine
tetra(1-imidazolyl)hydrazine
N,N-di-α-naphthyl-N',N'-di(3-methyl-4-hydroxyphenyl)hydrazine
N-3-furyl-N-(2-methyl-4-hydroxyphenyl)-N',N'-di-β-naphthylhydrazine
tetra-β-naphthylhydrazine
N,N'-di-β-naphthyl-N,N'-diphenylhydrazine
tetra-4-tolylhydrazine
N,N'-diphenyl-N,N'-di(3-methyl-4-hydroxyphenyl)hydrazine
N,N'-diphenyl-N,N'-di-p-chlorophenyl hydrazine
phenyltri-(2-methyl-5-hydroxyphenyl)hydrazine
N,N'-bicarbazyl
cyclotetrakis(3,9-carbazolylene)
6-(3-carbazolyl)-cyclotetrakis(3,9-carbazolylene)
6-(9-carbazolyl)-cyclotetrakis(3,9-carbazolylene)
3,3'-bis(3-carbazolyl)-9,9'-bicarbazolyl
3-(3-carbazolyl)-9-(9-carbazolyl)carbazole
3-(9-carbazolyl)-9,9'-bicarbazolyl
3,3'-diethyl-9,9'-bicarbazolyl
3,3'-diphenyl-9,9'-bicarbazolyl
3,3'-dichloro-9,9'-bicarbazolyl
4,4'-bis(diethylamino)-9,9'-bicarbazolyl
3,3'-diethoxy-9,9'-bicarbazolyl
1,1'-dihydroxy-9,9'-bicarbazolyl
2,2'-dicyano-9,9'-bicarbazolyl
tetra(p-diethylaminophenyl)hydrazine
3,3'-bis(1,5-diphenyl-2-pyrazoline)
3,3'-bis(1-p-tolyl-5-phenyl-2-pyrazoline)
3,3'-bis(1,5-[1-naphthyl]-2-pyrazoline)
1,5-diphenyl-3-[3'-(1'-p-tolyl-5'-phenyl)-2'-pyrazolyl]-2-pyrazoline
3,3'-bis(1,5-diphenyl-4,5-dimethyl-2-pyrazoline)
3,3'-bis(1,4,5-triphenyl-2-pyrazoline
3,3'-bis(1,5-di-p-tolyl-4-methoxy-2-pyrazoline)
3,3'-bis(1,5-diphenyl-4-dimethylamino-2-pyrazoline)
3,3'-bis[1,5-diphenyl-4-(p-chlorophenyl)-2-pyrazoline]
3,3'-bis[1,5-diphenyl-4,5-di-(p-diethylaminophenyl)-2-pyrazoline]
3,3'-bis[1,5-diphenyl-4-(p-methoxyphenyl)-5-ethyl-2-pyrazoline]
3,3'-bis(1,5-diphenyl-4-chloromethyl-2-pyrazoline)
1,5-diphenyl-4,5-dimethyl-3-[3'-(1'-p-tolyl-4'-diethyl-5',5'-methylphenyl)-2'-pyrazolyl]-2-pyrazoline
4-(p-diphenylaminophenyl)-3-buten-1-yne
p-diphenylaminostyrene
ethyl p-diphenylaminocinnamate
methyl p-diphenylaminocinnamate
p-diphenylaminocinnamoyl chloride
p-diphenylaminocinnamic acid N,N-diphenylamide
p-diphenylaminocinnamic acid anhydride
3-(p-diphenylaminophenyl)-2-butenoic acid
bis(p-diphenylaminobenzal) succinic acid
4-N,N-bis(p-bromophenyl)aminocinnamic acid
1-(4-diphenylamino)naphthacrylic acid
p-diphenylaminocinnamic acid
p-diphenylaminocinnamonitrile
7-diphenylamino coumarin
p-diphenylaminophenylvinylacrylic acid
p-diphenylaminobenzyl p'-diphenylaminocinnamate
7-(p-diphenylaminostyryl)coumarin
p-diphenylaminocinnamyl alcohol
4-diphenylaminocinnamaldehyde semicarbazone
O-p-diphenylaminocinnamoyl p'-diphenylaminobenzaldehyde oxime
p-diphenylaminocinnamaldehyde oxime
1,3-bis(p-diphenylaminophenyl)-2-propen-1-ol
methyl p-diphenylaminobenzoate
N,N-diphenylanthranilic acid
3-p-diphenylaminophenyl-1-propanol
4-acetyltriphenylamine semicarbazone
ethyl 2,6-diphenyl-4-(p-diphenylaminophenyl)benzoate
1-(p-diphenylaminophenyl)-1-hydroxy-3-butyne
4-hydroxymethyltriphenylamine
1-(p-diphenylaminophenyl)ethanol
4-hydroxytriphenylamine
2-hydroxytriphenylamine
4-formyltriphenylamine oxime
4-acetyltriphenylamine oxime
1-(p-diphenylaminophenyl)hexanol
1-(p-diphenylaminophenyl)dodecanol
p-diphenylaminobenzoic acid anhydride.
4-cyanotriphenylamine
p-diphenylamino benzoic acid N,N-diphenylamide
p-diphenylaminobenzoic acid
p-diphenylaminobenzoyl chloride
3-p-diphenylaminophenylpropionic acid
4-formyltriphenylamine semicarbazone
triphenyl-p-diethylaminophenylsilane
methyl-diphenyl-p-diethylaminophenylsilane
triphenyl-p-diethylaminophenylgermane
triphenyl-p-dimethylaminophenylstannane
triphenyl-p-diethylaminophenylstannane
diphenyl-di-(p-diethylaminophenyl)stannane
triphenyl-p-diethylaminophenylplumbane
tetra-p-diethylaminophenylplumbane
phenyl-di-(p-diethylaminophenyl)phosphine
bis(p-diethylaminophenyl)phosphine oxide
tri-p-dimethylaminophenylarsine
tri-p-diethylaminophenylarsine
2-methyl-4-dimethylaminophenylarsine oxide
tri-p-diethylaminophenylbismuthine
methyl-di-(p-diethylaminophenyl)arsine
methyl-di-(p-diethylaminophenyl)phosphine
phenyl-tri(p-diethylaminophenyl)stannane
methyl-tri(p-diethylaminophenyl)stannane
tetra-p-diethylaminophenylgermane
diphenyl-p-diethylaminophenylsilane
p-diethylaminophenylarsine
tetrakis-[diphenyl-(p-diethylaminophenyl)plumbyl]methane
tetrakis-[diphenyl-(p-diethylaminophenyl)stannyl]stannane
bis-[phenyl-(p-diethylaminophenyl)]dibismuthine
tri-(p-diethylaminophenyl)phosphine sulfide
di-(p-diethylaminophenyl)thioxotin The photoconductive layers of the invention can also be sensitized by the addition of effective amounts of sensitizing compounds to exhibit improved electrophotosensitivity. Sensitizing compounds useful with the photoconductive compounds of the present invention can be selected from a wide variety of materials, including such materials as pyrylium dye salts, including thiapyrylium dye salts and selenapyrylium dye salts disclosed in Van Allan et al. U.S. Pat. 3,250,615; fluorenes, such as 7,12- dioxo - 13 - dibenzo(a,h)fluorene, 5,10-dioxo-4a,11-diazabenzo(b)fluorene, 3,13-dioxo-7-oxadibenzo(b,g)fluorene, and the like; aromatic nitro compounds of the kinds described in U.S. Pat. 2,610,120; anthrones like those disclosed in U.S. Pat. 2,670,284; quinones, U.S. Pat. 2,670,-286; benzophenones U.S. Pat. 2,670,287; thiazoles U.S. Pat. 2,732,301; mineral acids; carboxylic acids, such as maleic acid, dichloroacetic acid, and salicylic acid; sulfonic and phosphoric acids; and various dyes, such as cyanine (including carbocyanine), merocyanine, diarylmethane, thiazine, azine, oxazine, xanthene, phthalein, acridine, azo, anthraquinone dyes and the like and mixtures thereof. The sensitizers preferred for use with the compounds of this invention are selected from pyrylium salts including selenapyrylium and thiapyrylium salts, and cyanine dyes including carbocyanine dyes.

Where a sensitizing compound is employed with the binder and organic photoconductor to form a sensitized electrophotographic element, it is the normal practice to mix a suitable amount of the sensitizing compound with the coating composition so that, after thorough mixing, the sensitizing compound is uniformly distributed in the coated element. Other methods of incorporating the sensitizer or the effect of the sensitizer may, however, be employed consistent with the practice of this invention. In preparing the photoconductive layers, no sensitizing compound is required to give photoconductivity in the layers which contain the photoconducting substances, therefore, no sensitizer is required in a particular photoconductive layer. However, since relatively minor amounts of sensitizing compound give substantial improvement in speed in such layers, the sensitizer is preferred. The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight based on the weight of the film-forming coating composition. Normally, a sensitizer is added to the coating composition in an amount by weight from about 0.005 to about 5.0 percent by weight of the total coating composition.

Solvents useful for preparing coating compositions with the binders of the present invention can include a wide variety of organic solvents for the components of the coating composition. For example, benzene; toluene; acetone; 2-butanone; chlorinated hydrocarbons such as methylene chloride; ethylene chloride; and the like; ethers, such as tetrahydrofuran and the like, or mixtures of such solvents can advantageously be employed in the practice of this invention.

In preparing the coating compositions utilizing the binders disclosed herein useful results are obtained where the photoconductive substance is present in an amount equal to at least about 1 weight percent of the coating composition. The upper limit in the amount of photoconductive material present can be widely varied in accordance with usual practice. It is normally required that the photoconductive material be present in an amount ranging from about 1 weight percent of the coating composition to about 99 weight percent of the coating composition. A preferred weight range for the photoconductive material in the coating composition is from about 10 weight percent to about 60 weight percent.

Coating thicknesses of the photoconductive composition on a support can vary widely. Normally, a wet coating thickness in the range of about 0.001 inch to about 0.01 inch is useful in the practice of the invention. A preferred range of coating thickness is from about 0.002 inch to about 0.006 inch before drying although such thicknesses can vary widely depending on the particular application desired for the electrophotographic element.

Suitable supporting materials for coating the photoconductive layers of the present invention can include any of the electrically conducting supports, for example, paper (at a relative humidity above 20 percent); aluminum-paper laminates; metal foils, such as aluminum foil, zinc foil, etc.; metal plates, such as aluminum, copper, zinc, brass, and galvanized plates; vapor deposited metal layers such as silver, nickel or aluminum on conventional film supports such as cellulose acetate, poly(ethylene terephthalate), polystyrene and the like conducting supports.

An especially useful conducting support can be prepared by coating a transparent film support material such as poly(ethylene terephthalate) with a layer containing a semiconductor dispersed in a resin. A suitable conducting coating can be prepared from the sodium salt of a carboxyester lactone of a maleic anhydridevinyl acetate copolymer, cuprous iodide and the like. Such conducting layers and methods for their optimum preparation and use are disclosed in U.S. 3,007,901, 3,245,833 and 3,267,807.

The compositions of the present invention can be employed in photoconductive elements useful in any of the well known electrophotographic processes which require photoconductive layers. One such process is the xerographic process. In a process of this type, an electrophotographic element held in the dark, is given a blanket electrostatic charge by placing it under a corona discharge to give a uniform charge to the surface of the photoconductive layer. This charge is retained by the layer owing to the substantial dark insulating property of the layer, i.e., the low conductivity of the layer in the dark. The electrostatic charge formed on the surface of the photoconductive layer is then selectively dissipated from the surface of the layer by imagewise exposure to light by means of a conventional exposure operation such as for example, by a contact-printing technique, or by lens projection of an image, or reflex or bireflex techniques and the like, to thereby form a latent electrostatic image in the photoconductive layer. Exposing the surface in this manner forms a pattern of electrostatic charge by virtue of the fact that light energy striking the photoconductor causes the electrostatic charge in the light struck areas to be conducted away from the surface in proportion to the intensity of the illumination in a particular area.

The charge pattern produced by exposure is then developed or transferred to another surface and developed there, i.e., either the charge or uncharged areas rendered visible, by treatment with a medium comprising electrostatically responsive particles having optical density. The developing electrostatically responsive particles can be in the form of a dust, or powder and generally comprise a pigment in a resinous carrier called a toner. A preferred method of applying such a toner to a latent electrostatic image for solid area development is by the use of a magnetic brush. Methods of forming and using a magnetic brush toner applicator are described in the following U.S. Patents: 2,786,439; 2,786,440; 2,786,441; 2,811,465; 2,874,063; 2,984,163; 3,040,704; 3,117,884; and reissue Re 25,779. Liquid development of the latent electrostatic image may also be used. In liquid development the developing particles are carried to the image-bearing surface in an electrically insulating liquid carrier. Methods of development of this type are widely known and have been described in the patent literature, for example, U.S. Patent 2,297,691 and in Australian Patent 212,315. In dry developing processes the most widely used method of obtaining a permanent record is achieved by selecting a developing particle which has as one of its components a low-melting resin. Heating the powder image then causes the resin to melt or fuse into or on the element. The powder is, therefore, caused to adhere permanently to the surface of the photoconductive layer. In other cases, a transfer of the charge image or powder image formed on the photoconductive layer can be made to a second support such as paper which would then become the final print after developing and fusing or fusing respectively. Techniques of the type indicated are well known in the art and have been described in a number of U.S. and foreign patents, such as U.S. Patents 2,297,691 and 2,551,582, and in "RCA Review," vol. 15 (1954) pages 469–484.

The compositions of the present invention can be used in electrophotographic elements having many structural variations. For example, the photoconductive composition can be coated in the form of single layers or multiple layers on a suitable opaque or transparent conducting support. Likewise, the layers can be contiguous or spaced having layers of insulating material or other photoconductive material between layers or overcoated or interposed between the photoconductive layer or sensitizing layer and the conducting layer. It is also possible to adjust the position of the support and the conducting layer by placing a photoconductor layer over a support and coating the exposed face of the support or the exposed or overcoated face of the photoconductor with a conducting layer. Configurations differing from those contained in the examples can be useful or even preferred for the same or different application for the electrophotographic element.

The following examples are included for a further understanding of this invention.

Example 1

1.5 grams of a chlorinated polyethylene binder containing 53.6 weight percent chlorine, 0.5 gram of 4,4'-benzylidene-bis(N,N-diethyl-m-toluidine) photoconductor and .02 gram of 2,4-bis(4-ethoxyphenyl)-6-(4-n-amyloxystyryl) pyrylium fluoroborate sensitizer are dissolved in 15.6 grams of methylene chloride by stirring the solids in the solvent for one hour at room temperature. The resulting solution is hand coated at a wet coating thickness of 0.004 inch on a conducting layer comprising a sodium salt of a carboxyester lactone, such as described in U.S. 3,260,706, which in turn is coated on a cellulose acetate film base. The coating block is maintained at a temperature of 32° C. This electrophotographic element is charged under positive corona source until the surface potential, as measured by an electrometer probe, reaches about 600 volts. It is then subjected to exposure from behind a stepped density gray scale to a 3000° K. tungsten source. The exposure causes reduction of the surface potential of the element under each step of the gray scale from its initial potential, $V_0$, to some lower potential, V, whose exact value depends on the actual amount of exposure in meter-candle-seconds received by the area. The results of the measurements are plotted on a graph of surface potential V vs. log exposure for each step. The shoulder speed is the numerical expression of $10^4$ multiplied by the reciprocal of the exposure in meter-candle-seconds required to reduce the 600 volt charged surface potential by 100 volts. The toe speed is the numerical expression $10^4$ multiplied by the reciprocal of the exposure in meter-candle-seconds required to reduce the 600 volt charged surface potential to 100 volts. This coating is found to have a positive 100 v. toe speed of 105. Similar results are obtained when 0.5 gram of bis(4-diethylamino)-1,1,1-triphenylethane or 0.5 gram of bis(4-diethylamino)tetra-phenylmethane are used as photoconductors in place of the 4,4'-benzylidene-bis-(N,N-diethyl-m-toluidine).

Example 2

Example 1 is repeated using chlorinated polyethlyenes having varying weight percentages of chlorine. These percentages and positive 100 volt toe speeds are set forth in the following Table II.

TABLE II

| Chlorinated polyethylene binder (percent Cl): | Electrical "H and D" +100 volt toe speeds |
|---|---|
| 54 | 90 |
| 57 | 100 |
| 57.7 | 120 |
| 60.8 | 110 |
| 62.4 | 110 |
| 64.0 | 110 |
| 69.3 | 80 |
| 25.0 | (¹) |
| 36.0 | (¹) |
| 42.0 | (¹) |

¹ Binder was insoluble in coating composition and thus could not be coated.

Example 3

Example 1 is repeated except that the photoconductor used is 4,4'-bis(diphenylaminochalcone) and the binder used is a chlorinated polyethylene containing 62.4% chlorine. A positive 100 volt toe speed of 280 is obtained. When the same element is negatively charged, good negative toe speeds are obtained.

Example 4

Example 3 is repeated except that the sensitizer used is 6-chloro-1'-methyl-1,2',3'-triphenylimidazo[4,5b]-quinoxalino-3'-indolocarbocyanine p-toluene sulfonate. A positive 100 volt toe speed of 400 is obtained.

Example 5

Example 1 is repeated using chlorinated polypropylenes having varying weight percentages of chlorine. These percentages and positive 100 volt toe speeds are set forth in the following Table III.

TABLE III

| Chlorinated polypropylene binder (percent Cl): | Electrical "H and D" +100 volt toe speeds |
|---|---|
| 59 | 140 |
| 56 | 90 |
| 51 | 100 |

Example 6

Example 1 is repeated using a chlorinated ethylene/propylene copolymer (2% ethylene) having varying weight percentages of chlorine. These percentages and positive 100 volt toe speeds are set forth in the following Table IV.

TABLE IV

| Chlorinated ethylene/propylene binder (percent Cl): | Electrical "H and D" +100 volt toe speeds |
|---|---|
| 61 | 140 |
| 53 | 110 |

Example 7

Example 1 is repeated using a chlorinated ethylene/propylene copolymer (90% ethylene) having approximately 60% by weight chlorine. A good positive 100 volt toe speed is obtained.

Example 8

Example 1 is repeated using a chlorinated propylene/butylene copolymer (50% propylene) having approximately 60% by weight chlorine. A very acceptable positive 100 volt toe speed is obtained.

Example 9

Example 1 is repeated using a chlorinated polybutene polymer. A positive 100 volt toe speed is obtained which is comparable to that obtained when chlorinated polypropylene is used.

Example 10

In order to demonstrate the improvement in speeds obtainable with the novel binders of this invention, a photoconductive composition similar to Example 1 is prepared using a conventional polystyrene binder. The positive 100 volt toe speed of this composition is 4. When a poly(vinylbutyral) binder is used, the positive 100 volt toe speed is 32.

Example 11

The coating compositions of Examples 1–9 are again coated in the manner described in Example 1. In a darkened room, the surface of each of the photoconductive layers so prepared is charged to a potential of about +600 volts under a corona charger. The layer is then covered with a transparent sheet bearing a pattern of opaque and light transmitting areas and exposed to the radiation from an incandescent lamp with an illumination intensity of about 75 meter-candles for 12 seconds. The resulting electrostatic latent image is developed in the usual manner by cascading over the surface of the layer a mixture of negatively charged black thermoplastic toner particles and glass beads. A good reproduction of the pattern results in each instance.

The halogenated polymers used as binders in accordance with the invention in the above examples can be made by treating a solution of the poly-α-olefin with halogen until the desired halogen content is reached. The polymer is recovered by conventional techniques.

The invention has been described in detail with particular reference to preferred embodiments thereof but it will be understood that variations and modifications can be effected within the spirit and scope of the invention.

We claim:

1. An electrophotographic element comprising a conductive support having thereon a photoconductive composition comprising a non-polymeric, organic photoconductor and a halogenated poly-α-olefin binder selected from the group consisting of:
   (a) a halogenated poly-α-olefin containing from about 45 to about 80% by weight of halogen prepared from α-olefin monomers having 3 to 4 carbon atoms;
   (b) a halogenated poly-α-olefin copolymer containing at least 50% by weight of halogen, said copolymer comprising 50% or greater repeating units of ethylene together with repeating units derived from α-olefin monomers having 3 to 4 carbon atoms; and
   (c) a halogenated poly-α-olefin copolymer containing from about 45 to about 80% by weight of halogen, said copolymer comprising 50% or greater repeating units derived from α-olefin monomers having 3 to 4 carbon atoms together with ethylene repeating units.

2. The electrophotographic element of claim 1 wherein the photoconductive composition contains a sensitizer selected from the group consisting of cyanine and pyrylium dye salts.

3. The electrophotographic element of claim 1 wherein the halogenated poly-α-olefin binder comprises a halogenated poly-α-olefin containing from about 45 to about 80% by weight of halogen prepared from an α-olefin monomer having 3 to 4 carbon atoms.

4. The electrophotographic element of claim 1 wherein the halogenated poly-α-olefin binder comprises a halogenated poly-α-olefin copolymer containing from about 45 to about 80% by weight of halogen prepared from a mixture of α-olefin monomers having 3 to 4 carbon atoms.

5. The electrophotographic element of claim 1 wherein the halogenated poly-α-olefin binder comprises a halogenated poly-α-olefin copolymer containing at least 50% by weight of halogen, said copolymer comprising 50% or greater repeating units of ethylene together with repeating units derived from an α-olefin monomer having 3 to 4 carbon atoms.

6. The electrophotographic element of claim 1 wherein the halogenated poly-α-olefin binder comprises a halogenated poly-α-olefin copolymer containing from about 45 to about 80% by weight of halogen, said copolymer comprising 50% or greater repeating units derived from an α-olefin monomer having 3 to 4 carbon atoms together with ethylene repeating units.

7. An electrophotographic element comprising a conductive support having thereon a photoconductive composition comprising a non-polymeric organic photoconductor, a sensitizing amount of a sensitizer and a halogenated poly-α-olefin binder selected from the group consisting of:
   (a) a halogenated poly-α-olefin containing from about 45 to about 70% by weight of halogen prepared from α-olefin monomers having 3 to 4 carbon atoms;
   (b) a halogenated poly-α-olefin copolymer containing from about 50% to about 70% by weight of halogen, said copolymer comprising 50% or greater repeating units of ethylene together with repeating units derived from an α-olefin monomer having 3 to 4 carbon atoms; and
   (c) a halogenated poly-α-olefin copolymer containing from about 45 to about 70% by weight of halogen, said copolymer comprising 50% or greater repeating units derived from an α-olefin monomer having 3 to 4 carbon atoms together with ethylene repeating units.

8. The electrophotographic element of claim 7 wherein the photoconductor is selected from the group consisting of polyarylalkanes having at least one amino group and 4-diaryl-amino-substituted chalcones.

9. The electrophotographic element of claim 7 wherein the sensitizer is selected from the group consisting of cyanine and pyrylium dye salts.

10. An electrophotographic element comprising a support having coated thereon a photoconductive composition and comprising from about 10 to about 60 weight percent of a nonpolymeric organic photoconductor, 0.005 to about 5.0 weight percent of a sensitizer selected from the group consisting of cyanine and pyrylium dye salts and a chlorinated polypropylene binder from about 45 to about 70% by weight of chlorine.

11. A process for producing a visible image comprising the steps of:
   (a) charging an electrophotographic element as described in claim 1;
   (b) exposing said element in an imagewise manner to a pattern of actinic radiation to form an electrostatic charge pattern; and
   (c) developing said electrostatic charge pattern to form a visible image.

12. The process of claim 11 wherein the binder is chlorinated polypropylene.

References Cited

UNITED STATES PATENTS

| | | | |
|---|---|---|---|
| 3,245,786 | 4/1966 | Cassiers et al. | 96—1 |
| 3,250,615 | 5/1966 | Van Allan et al. | 96—1 |

FOREIGN PATENTS

| | | |
|---|---|---|
| 964,878 | 7/1964 | Great Britain. |

CHARLES E. VAN HORN, Primary Examiner

M. B. WITTENBERG, Assistant Examiner

U.S. Cl. X.R.

117—218; 260—92.8 AC; 94.9 H